United States Patent [19]

Boucharlat et al.

[11] Patent Number: 4,695,890
[45] Date of Patent: Sep. 22, 1987

[54] LINE TRANSFER READING DEVICE WITH FEEDBACK REGULATING THE DRIVE CHARGE

[75] Inventors: Gilles Boucharlat; Louis Brissot, both of St. Egreve, France

[73] Assignee: Thomson-CSF, Paris, France

[21] Appl. No.: 849,197

[22] Filed: Apr. 7, 1986

[30] Foreign Application Priority Data

Apr. 19, 1985 [FR] France ............... 85 06009

[51] Int. Cl.⁴ .............................................. H04N 3/14
[52] U.S. Cl. ............................ 358/213.31; 358/213.18
[58] Field of Search ............................ 358/213, 212; 357/24 LR; 377/57–59

[56] References Cited

U.S. PATENT DOCUMENTS

| 4,262,217 | 4/1981 | Levine | 377/59 |
| 4,443,818 | 4/1984 | Ohba et al. | 358/213 |
| 4,528,596 | 7/1985 | Cope | 358/213 |
| 4,584,609 | 4/1986 | Klein et al. | 358/213 |
| 4,617,595 | 10/1986 | Berger | 358/213 |
| 4,621,291 | 11/1986 | Takemoto et al. | 358/213 |

FOREIGN PATENT DOCUMENTS 0078038  5/1983  European Pat. Off. .

Primary Examiner—Gene Z. Rubinson
Assistant Examiner—Stephen Brinich
Attorney, Agent, or Firm—Roland Plottel

[57] ABSTRACT

The present invention provides a device for reading a matrix of photosensitive detectors by line transfer with feedback, wherein means provide feedback of a part of the video signal from a line of the matrix which is read to a stage for series injection of a drive charge at the input of a register providing reading successively of each line of detectors of the matrix. Thus the value of the drive charge is modulated which is intended to be added to the video signal of the line of the matrix which will then be read, such modulation being directly proportional to the video signal of the line which is read and dependent on the transfer inefficiency of the device.

2 Claims, 8 Drawing Figures

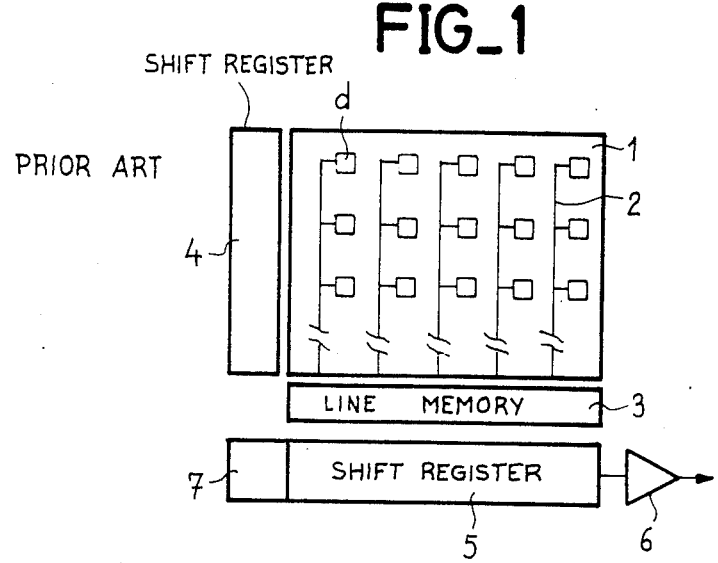
FIG_1 PRIOR ART
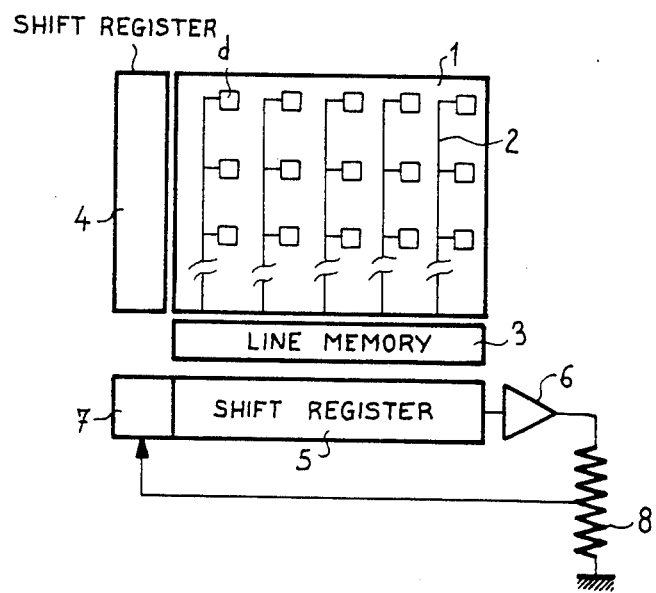
FIG_3

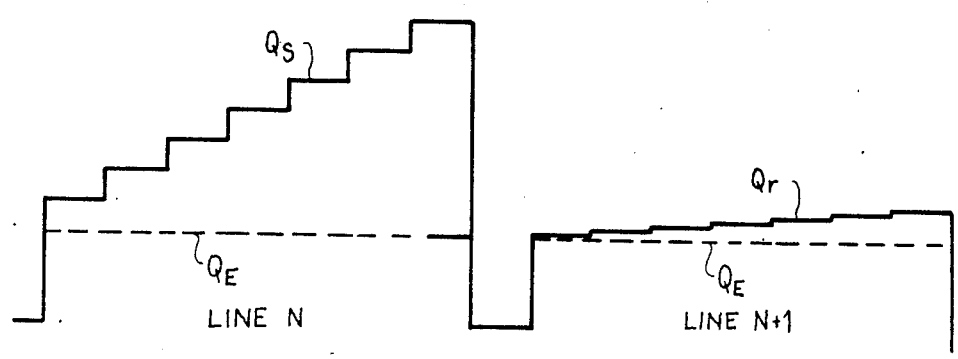
FIG_2
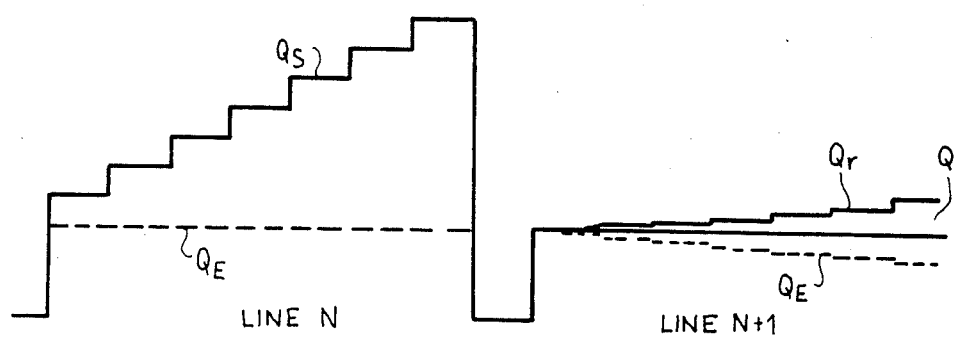
FIG_4

FIG_5-a
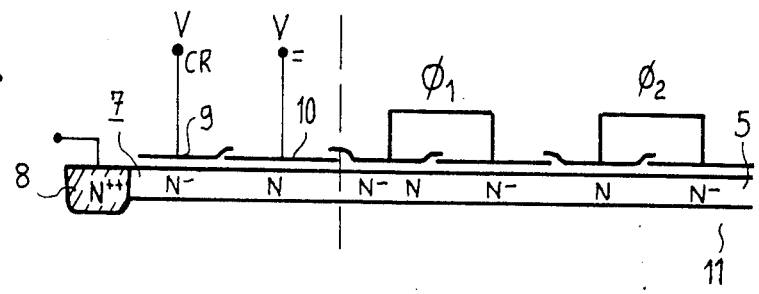
FIG_5-b
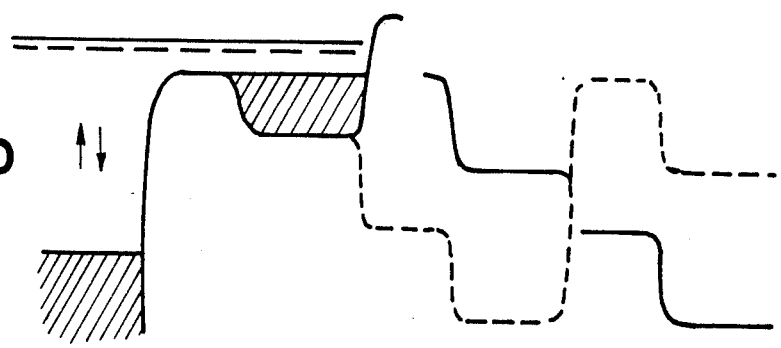
FIG_6
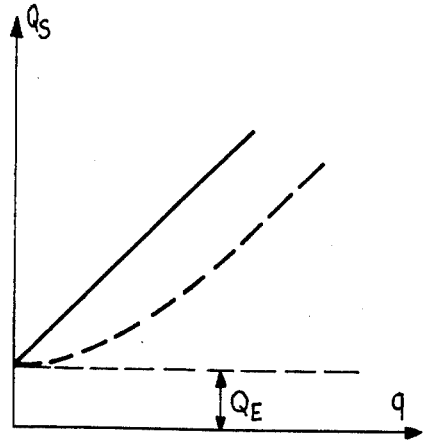
FIG_7
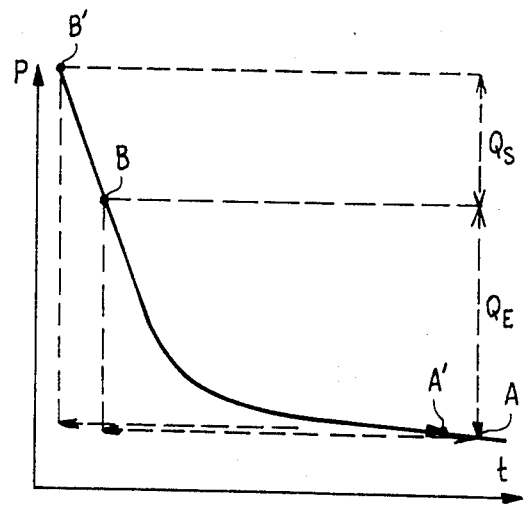

LINE TRANSFER READING DEVICE WITH FEEDBACK REGULATING THE DRIVE CHARGE

BACKGROUND OF THE INVENTION

1. Field of the Invention

The present invention relates to a line transfer reading device with feedback.

2. Description of the Prior Art

It is well known in the prior art to read matrices of photosensitive detectors, such for example as diodes or MOS transistors, by the line transfer method.

In FIG. 1 has been shown schematically such a line transfer reading device. This device comprises a matrix 1 of photosensitive detectors d disposed in lines and columns. Conducting buses 2 connect the detectors disposed in the same column to the input of a line memory 3. A shift register 4 is provided for addressing a line of detectors of the matrix. The charges from the detectors of the adressed line are transfered to the line memory 3, then to a charge transfer shift register 5 whose output is connected to an amplifier 6.

To improve the efficiency in transferring the charges from bus 2, having high capacities of the order of a few picofarads for example, to the charge transfer shift register 5, a drive charge $Q_E$ is used. This charge is transferred from each stage of register 5 to the memory 3 then to a bus 2 and is then superimposed on the signal charges $Q_S$ which arrive on this bus, transferred to the line memory then to the register 5 to be read superimposed on the signal charges.

In FIG. 1, an embodiment has been shown in which a stage 7 ensures the injection of identical drive charges at the input of register 5. At the time when register 6 is read, a drive charge $Q_E$ is introduced into each stage of the register which has just been read.

The use of drive charges following such a path (register, memory, bus then bus, memory register and reading with the signal charges) is known under the name of "charge priming device or CPD. Thus the transfer efficiency is improved, that is to say reading of the charges coming from the buses.

Incomplete reading of the charges from the buses modifies the quiescent potential of the buses and introduces a mixture of informations from two lines of the matrix read successively. This results in a loss of vertical resolution when the device is used for image scanning, that is to say when two adjacent lines are read successively. The phenomenon observed is much more troublesome when the two lines read successively are not adjacent, that is to say when random addressing of the lines occurs, as for example in robotics. That results in the appearance of parasite signals.

Have been shown, in FIG. 2 on the left, the signal charge amounts $Q_S$ obtained at the output of register 5 when a line N is read. These signal charges are superimposed on a drive charge $Q_E$, of constant value, shown with a broken line.

In FIG. 2, in the right hand part, has been shown the reading of line N+1 which does not contain any signal charge. We find, superimposed on the constant drive charge $Q_E$, a residual signal charge $Q_R$ which has the same profile as the signal charge $Q_S$ of line N which is shown in FIG. 2 in the left hand part.

SUMMARY OF THE INVENTION

The present invention provides a line transfer reading device with feedback which substantially cancels out the effects of incomplete reading of the charges present on the buses.

The invention improves then the vertical field transfer mode in the case of sequential vertical addressing and eliminates the parasite signals in the case of random vertical addressing.

The present invention provides a device for reading a matrix of photosensitive detectors by line transfer, having a stage for series injection of a drive charge at the input of a register ensuring the reading successively of each line of detectors of the matrix, which device comprises means providing feedback of a portion of the video signal from a line of the matrix which is read to the injection stage, so as to modulate the value of the drive charge which is added to the video signal of the line of the matrix which will then be read, this modulation being directly proportional to the video signal of the line which is read and dependent on the transfer inefficiency of the device.

BRIEF DESCRIPTION OF THE DRAWINGS

Other objects, features and results of the invention will be clear from the following description, given by way of non limitative example and illustrated by the accompanying Figures which show:

FIG. 1, the diagram of a line transfer reading device of the prior art,

FIG. 2, a diagram illustrating the operation of the devce of FIG. 1,

FIG. 3, the diagram of one embodiment of a line transfer reading device according to the invention;

FIG. 4, a diagram illustrating the operation of the device of FIG. 3;

FIGS. 5a and b, the diagram of one embodiment of a charge injection stage and a diagram explaining its operation;

FIG. 6, the characteristic of transfer of the charges between the buses and the register; and FIG. 7, a curve showing the evolution of the potential of a bus during a reading sequence.

In the different Figures, the same references designate the same elements but, for the sake of clarity, the sizes and proportions of the different elements have not been respected.

DESCRIPTION OF THE PREFERRED EMBODIMENTS

FIG. 3 shows the diagram of one embodiment of a line transfer photosensitive device according to the invention.

This device differs from the prior art for it comprises means providing feedback of a portion of the video signal from a line of the matrix which is read to the injection stage 7 so as to modulate the value of the drive charge which is added to the video signal of the line of the matrix which will then be read. In FIG. 3, these means are represented by a potentiometer 8 whose middle point is connected to the drive charge injection stage 7.

FIG. 4 is a diagram illustrating the operation of the device of FIG. 3.

In the left hand part of FIG. 4, the output signal of register 5 has been shown during the reading of a line N. This output signal is formed by the superimposition 20 of a constant drive charge $Q_E$ and a staircase signal charge $Q_S$.

In the right hand part of FIG. 4, the residual signal $Q_r$ has been shown having the same profile as $Q_S$ which is present in register 5, during the next reading which may be reading of line N+1 for example.

According to the invention, a drive charge $Q_E$ is injected into register 5 for the purpose of compensating the signal $Q_r$. The drive charge $Q_E$ of FIG. 4, in the right hand part, is then not constant but has a profile symmetrical to that of $Q_r$.

In the example shown in FIG. 4, on the right, where the signal charge $Q_S$ of line N+1 is zero, at the output of register 5a substantially constant charge Q is obtained equal to the sum of the residual charge $Q_r$ and the drive charge $Q_E$ having undergone feedback.

Such modulation of the drive charge modifies its value in a way directly proportional to that of the reading signal of the line which is read and depending on the transfer inefficiency of the device.

Such modulation of the drive charge is performed for each value of the drive charge which is entered in a stage of register 5.

In FIG. 5a, one embodiment of the injection stage 7 has been shown in greater detail.

This injection stage 7 is formed by a diode 8 followed by two gates 9 and 10 which lead to the shift register 5.

In the embodiment shown in FIG. 5a, the direction of transfer of the charges, from left to right, in the injection stage and in the register is imposed by implantations successively of type N⁻ and N in a P semiconductor substrate 11. The transfer of the charges takes place in volume.

The direction of transfer of the charges would of course be determined, for example, by different oxide thicknesses or by different potentials on the different electrodes.

The charges are injected into stage 7 in the "fill and spill" mode.

The injection diode 8 is therefore brought successively to a low level then to a high level, as is illustrated in FIG. 5b which represents the surface potentials in the substrate. When the diode is brought to the low level, there is storage of charges under gate 10 brought to a constant potential V.

Gate 9 receives a voltage $V_{CR}$ from the middle point of potentioneter 8—see FIG. 3—and which is proportional to the output signal of register 5.

The higher this voltage $V_{CR}$, the smaller is the charge stored under gate 10 and then transferred to the register. Thus there is in fact feedback.

The "fill and spill" mode has in particular the following advantages:

the drive charge which is thus injected has a minimum random fluctuation of its amplitude;

in addition, this mode ensures maximum insensitivity to external parasites.

These advantages are due to the fact that the charge amount stored depends only on the difference of the surface potentials under the two gates 9 and 10, which are closely related and strongly coupled. Even if the injection diode 8 is subjected to parasites, that has no influence on the injected charge amount.

Different variants may of course be contemplated for the injection stage 7. For example, a constant voltage may be applied to gate 9 and a variable voltage to gate 10 so as to modulate the value of the drive charge.

The invention has another advantage which is to linearize the transfer characteristic representing the read charge amount $Q_S$ at the output of register 5 for a line as a function of the charge amount q on the corresponding bus before transfer.

This characteristic is shown in FIG. 6 where a non linear characteristic has also been shown with a broken line.

Such linearization is explained by means of FIG. 7 which shows the evolutions of the potential of a bus P during a reading sequence.

In this curve, point A has been shown which is the quiescent point in the absence of signal charges. This quiescent point results from the preceding iterations.

When a bus receives a drive charge $Q_E$, then a signal charge $Q_S$, its potential passes to B then to B'.

Reading of the charges brings the potential of the bus back to a point A' different from point A.

The potential difference between A' and A is representative of the transfer inefficiency.

Now this potential difference depends on the position of the starting point so on the amplitude of the signal charges previously read.

The difference between A' and A only introduces an effect of the second order if the amplitude of the drive charge is correctly chosen.

Thus the grey range is not degraded if the device is used for picture scanning.

On the other hand, for applications in photometry, the systematic errors of linearity may become not inconsiderable.

The feedback of the invention in which the drive charge for each bus is modulated has a function of the amplitude of the signals of the previously read line, so as to compensate for the residual signal charge, provides a return substantially to the same point A after introduction of the drive charge, of the signal charge and after reading the charges. The quiescent point on the curve is stabilized and the transfer characteristic is linearized.

What is claimed is:

1. A device for reading a matrix of photosensitive detectors by line transfer, having a stage for series injection of a drive charge at the input of a register ensuring the reading successively of each line of detectors of the matrix, which device comprises means providing feedback of a portion of the video signal from a line of the matrix which is read to the injection stage so as to modulate the value of the drive charge which is added to the video signal of the line of the matrix which will then be read, this modulation being directly proportional to the video signal of the line which is read and dependent on the transfer inefficiency of the device.

2. The device as claimed in claim 1, wherein the injection stage functions in the "fill and spill" mode and comprises:

a diode brought successively to a low level and to a high level;

two gates, the first one receiving a portion of the video signal from said register and the second being connected to a constant bias voltage.

* * * * *